J. F. MONNOT.
PROCESS OF MAKING COMPOUND METAL BODIES.
APPLICATION FILED MAY 23, 1905.
916,471.
Patented Mar. 30, 1909.
2 SHEETS—SHEET 1.
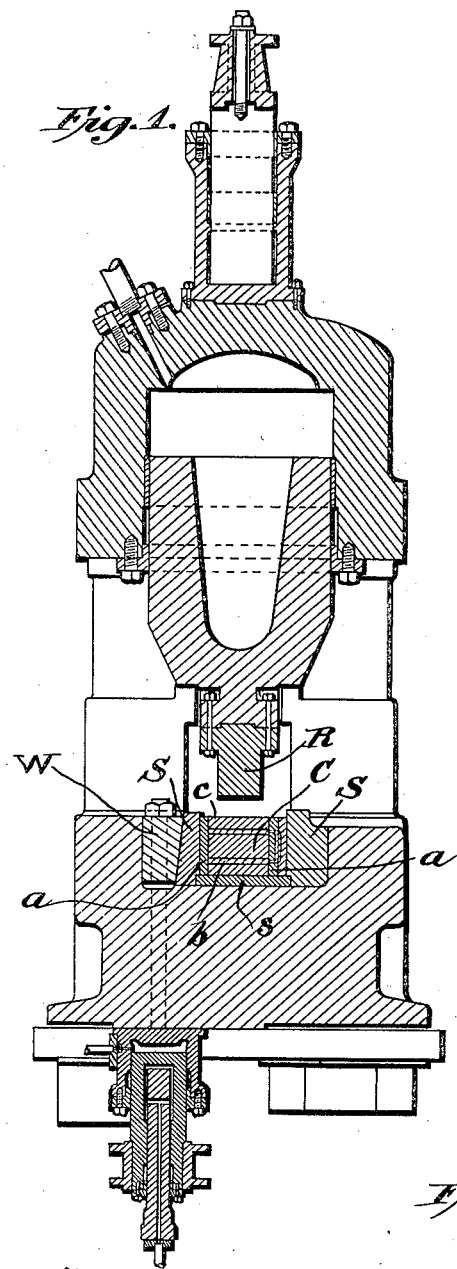
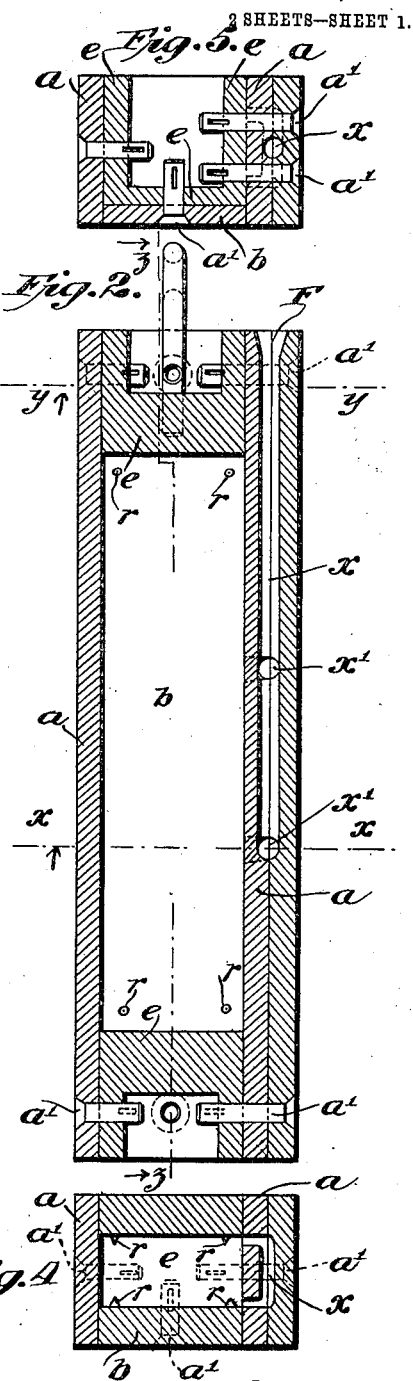
Attest:
Inventor:
JOHN FERREOL MONNOT
by Dickerson, Brown, Raegener & Binney
Attys.

J. F. MONNOT.
PROCESS OF MAKING COMPOUND METAL BODIES.
APPLICATION FILED MAY 23, 1905.
916,471.
Patented Mar. 30, 1909.
2 SHEETS—SHEET 2.
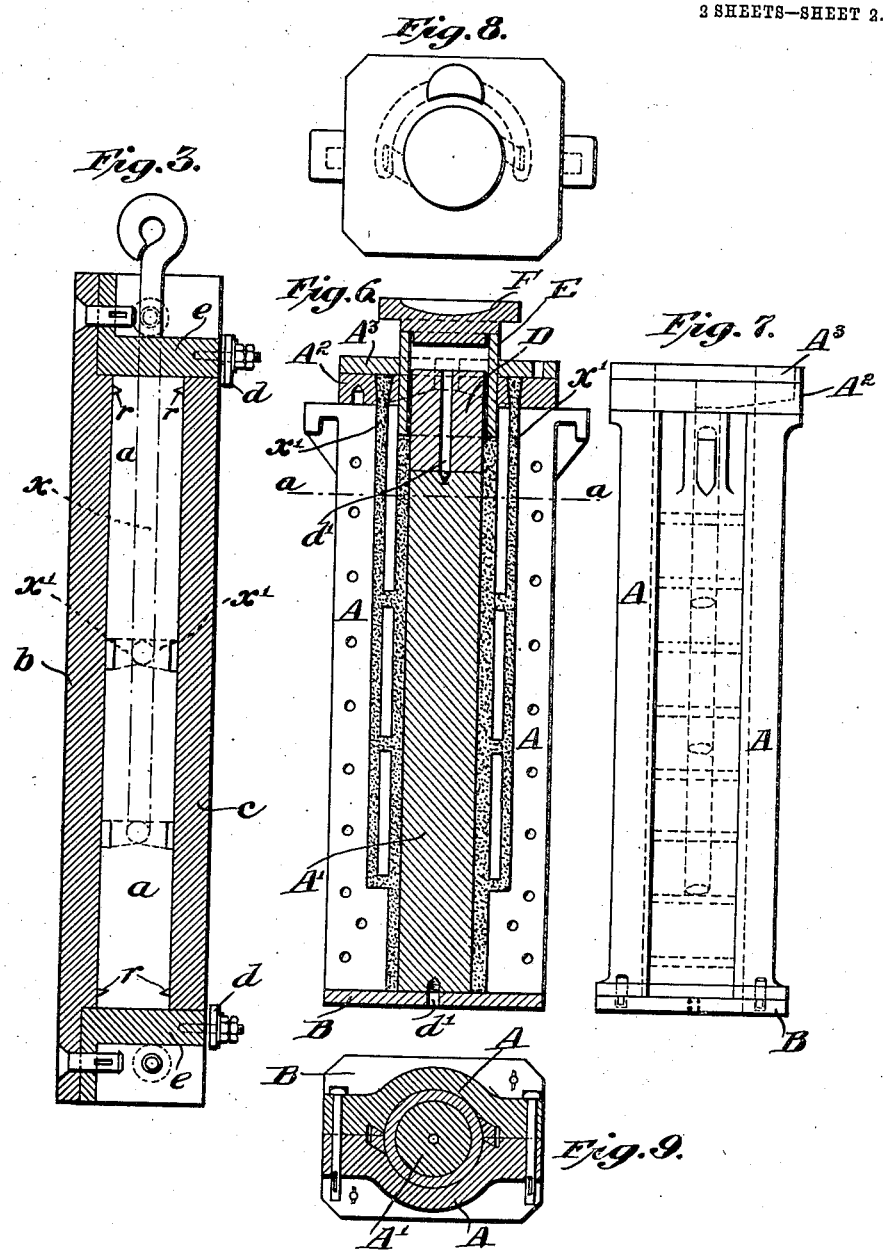
Attest:
J. C. Mitchell
Olin N. Foster
Inventor:
John Ferreol Monnot
by Dickerson, Brown, Raegener & Binney
Attys.

UNITED STATES PATENT OFFICE.

JOHN FERREOL MONNOT, OF NEW YORK, N. Y., ASSIGNOR TO DUPLEX METALS COMPANY, OF NEW YORK, N. Y., A CORPORATION OF NEW YORK.

PROCESS OF MAKING COMPOUND METAL BODIES.

No. 916,471.　　　Specification of Letters Patent.　　Patented March 30, 1909.

Application filed May 23, 1905. Serial No. 261,739.

*To all whom it may concern:*

Be it known that I, JOHN FERREOL MONNOT, a citizen of the United States, and resident of the borough of Manhattan, city, county, and State of New York, have invented certain new and useful Improvements in Processes of Making Compound Metal Bodies, of which the following is a specification accompanied by drawings.

My invention relates to improvements in processes of making compound metal bodies, such bodies or articles comprising ingots, plates, sheets, rods, tubes, wire, structural shapes and other articles composed of layers or strata of unlike metals firmly and autogenously welded together.

My present invention consists in the novel process herein described for producing such articles; all as more fully hereinafter set forth, matters of novelty being particularly pointed out in the appended claims.

Compound articles composed of unlike metals welded together may be used to great advantage in a variety of arts and for many different purposes as combining the specific advantages of the component unlike metals. For example, plates, sheets, etc., composed of a strong but readily oxidizable metal, such as iron or steel, covered with an impervious coherent coating of copper or other less oxidizable metal, may be used to great advantage in lieu of ordinary iron or steel sheets, plates, etc., wherever such articles are to be exposed to the weather, air or other oxidizing influences, or to the action of corroding liquids, gases, vapors, foods, etc., which readily attack iron or steel, but do not attack at all, or at least to so serious an extent, the coating metal employed. Such articles composed of copper, brass, silver, aluminum, etc., backed with iron or steel may be used with great advantage where considerable strength or stiffness of metal is desired, coupled with the chemical, physical, electrical or other properties, or the color or appearance of the non-ferrous metals mentioned. For electrical conductors it is desirable to combine the high electrical conductivity of copper, aluminum, etc., with the great strength of steel. Many other such uses might be mentioned. In all such cases, it is a prime requisite that the ferrous and non-ferrous metals shall be so inseparably united that a compound ingot formed by joining them shall be capable of great extension or working, as by rolling, drawing, spinning, etc., to make thin sheets, rods, angles, tubes, wire, etc., without separation of the united layers, without development of seams, pores, flows, etc.; and it is in practice desirable that during such working the strata of the joined metals shall maintain substantially their original relative proportions, even down to the thinnest extended article produced.

The object of my present invention is to devise a method of making compound ingots of this character from such pairs of unlike or chemically different metals as steel and copper, steel and brass or other copper alloys, steel and silver, steel and aluminum, or indeed any other pair of ferrous and non-ferrous metals; to form such bi-metallic ingots of any desired shape or dimensions and with any desired relative proportions of the component metals; to produce such a strong, autogenous and weld-like union between the unlike metals as shall be incapable of separation by heat or mechanical stress, and shall be adapted to permit indefinite co-extension of the joined metals in a compound ingot by any of the ordinary methods of working with said union extending throughout and persisting at all meeting points of the joined metals, and with the same relative proportions of the component unlike metals in the extended ware as in the original compound ingot; to produce such compound ingots as shall be susceptible of coextension with the same ease as ingots of simple metal; to produce in the coextended ware derived therefrom articles comparable in price with ordinary coated metals, like electroplated, tinned and galvanized ware while far superior in quality; to produce in such coextended coated ware, coatings which shall be hard, dense, free from all pores, scale spots, flaws, blisters or points of separation, and shall be weld-united with the base throughout; and it is, further, my object in said method to accomplish these desirable ends and others, by a simple, cheap and easy process requiring no highly skilled labor.

Suitable apparatus for carrying out the process is shown in the accompanying drawings, in which,—

Figure 1 is a vertical sectional view of a suitable press for carrying out the process; Fig. 2 is a horizontal sectional view of a suitable mold for carrying out the process; Fig. 3 is a vertical longitudinal sectional view of the mold on the line $zz$ of Fig. 2, looking in the direction of the arrows; Fig. 4 is a vertical transverse sectional view of the mold on the line $xx$ of Fig. 2, looking in the direction of the arrows; Fig. 5 is a vertical transverse sectional view of the mold on the line $yy$ of Fig. 2, looking in the direction of the arrows; Fig. 6 is a vertical sectional view of another form of mold; Fig. 7 is a modification of said mold; Fig. 8 is a top plan view, and Fig. 9 is a horizontal sectional view on the line $aa$ of Fig. 6.

Briefly stated, my process consists in thoroughly cleaning a surface of a body of the more infusible metal intended for the base or core of the finished compound ingot, said body being in the form of a billet, slab, ingot, bar or other commercial form; bringing the billet to a suitable high temperature by any method of heating in which oxidation or other contamination of the cleaned surface is prevented; contacting therewith, as by casting on, a highly heated molten metal in proper quantity to form a layer or stratum of the desired thickness; compressing the two metals together while still hot and in a more or less fluent condition, thereby completing the weld and suppressing all blowholes, flaws or other defects which might remain in the cast coating metals; and thereafter extending the compound ingot to produce coextended ware such as plates, sheets, tubes, wire, etc., comprising the joined metals inseparably united.

I have found that in order to perfectly weld two unlike metals of such different character as steel and copper, that all oxidation or other contamination should be prevented on the surface of contact, that such metals should be presented to each other with absolutely metallic surfaces; and that the metals should be subjected to pressure at all points of contact while the union or weld is forming. Pressure however and temperature are in some degree interchangeable and the higher the heat of the metals to be united, the lower the pressure necessary to obtain a perfect weld.

In carrying out my process, it is important that the core or base used while being heated up to the temperature necessary for the desired union shall be so heated as to preclude all oxidation or contamination, this being particularly necessary in the case of such an oxidizable metal as steel. Many different ways of performing such heating may be used. The core may be simply placed in the ingot mold which is later to be used to form the compound ingot, and there heated in an atmosphere of a gas which is indifferent at the temperature employed, such as carbon monoxid, carbon dioxid, etc. Any other receptacle, such as a simple tube or chamber may of course be used, but in such case the core must be transferred to the mold when hot without permitting access of air to the cleaned surfaces. If desired, an electric current may be used for heating in these receptacles. Or the clean core may be plunged in a molten bath of the unlike metal to be used for coating and heated therein before transferring to the ingot mold.

Any suitable apparatus may be utilized for carrying out this process, but I have illustrated in the drawings apparatus which will operate satisfactorily and well. Preferably the core metal is placed in a suitable mold so constructed that the molten coating metal may be poured in and around the core. The mold is also preferably constructed in such a manner that a portion of the same is movable, whereby pressure may be applied to the contents by means of a suitable press.

For making bi-metallic slabs to be used afterward for the production of plates, sheets and the like, in which the coating is generally required on one or two sides, a mold may be used such as illustrated in Figs. 2, 3, 4 and 5. This mold is preferably of rectangular section and of such construction as to fit in the dies of the hydraulic press illustrated in Fig. 1. In the construction illustrated the two sides $a\,a$ and the bottom $b$ of the mold are suitably secured as by means of bolts to the two ends $e\,e$ which are preferably provided with flanges for the insertion of the bolts. In order that the mold may be easily taken apart, key bolts $a'$ are provided. The top $c$ of the mold in this instance is free to move inward between the fixed sides $a\,a$ and ends $e\,e$ in which it should substantially exactly fit. The top $c$ is suitably prevented from moving outward as by means of the two swinging blocks $d$. A runner $x$ is provided extending through one side $a$ of the mold, and branches $x'$ extend from said runner substantially to the top and bottom of the mold whereby the metal may be run into the funnel F and thence through the runner $x$ and its branches to the top and bottom of the core which is placed in the mold.

The slab C for the core of suitable size is set in the mold by removing the top plate $c$ and suitable means are provided for supporting the core in the mold at the desired distance above the bottom so that the molten metal for the coating may be poured under the core. In this instance small studs $r$ are provided of a length substantially equal to the thickness desired for the coating for the core. The top plate $c$ is also supported above the top of the core by studs $r$, thus leaving on each side of the core a space for the coating metal.

Obviously if the mold and core were to be set on edge in a suitable die, the core should also be arranged in the mold in such manner that the molten metal may be poured at each side of the same. The top c of the mold is then placed in position and the swinging blocks d are turned to maintain the top in position. The mold and its core are then heated according to one of the methods described for preventing oxidation. For instance, the space between the inside of the mold and the core may be filled with carbonic acid gas or any other neutral gas in any suitable manner to prevent oxidation of the core metal. The core and mold are then suitably heated to a sufficiently high temperature so that they will not chill the molten coating metal too rapidly when poured in, and so that the latter may remain in a fluent or plastic condition for a time. When the core is at the desired temperature the mold is set on end and the molten metal for the coating of a different kind from the core is poured through the funnel F and the runner x into the spaces left between the core and the inside surface of the mold. The mold is then carried rapidly to the dies of the hydraulic press illustrated in Fig. 1 and placed between the die-blocks S S. Preferably a wedge W is provided, with suitable actuating means, for holding the mold firmly in place upon the base plate s. Pressure is applied to the material in the mold by means of the ram R which bears upon the top plate c of the mold and forces it down into the mold and thus strongly compresses the two metals together on all surfaces of contact, the fluent coating metal acting to transmit pressure like a fluid, causing a perfect weld on all the contact surface of the core and coating metal and suppressing all blow-holes or other defects in the cast coating metal. When the pressure is released and the bi-metallic ingot produced is sufficiently cold, it is taken out of the mold and treated by re-heating and rolling for finished products of the desired character. It is evident that the different ways described for protecting the core metal from oxidation during the heating are applicable in any case as desired.

If it is desired to make ingots or billets for bi-metallic wire or other articles requiring a uniform and continuous coating a mold such as illustrated in Figs. 6, 7, 8 and 9 may be used. This mold is shown of circular cross section, but it of course may be made square, rectangular, elliptical, or any other desired section. It is preferably made in two parts A suitably secured together as by means of bolts, and in this instance a double runner x' is provided for casting the coating metal substantially equally around the core A'. As shown, the runners x' extend down through the sides A of the mold and communicate with the interior thereof at different heights. The two portions A of the mold having been bolted together, the mold is then set on its base B and the core A' is centered in the mold as by means of the studs d'. On top of the billet core A' is placed a block D of the same size as the core and around this block is placed the sleeve or bushing E, which fits exactly around it and inside the mold and projects out of the top of the mold. Upon the top of the mold are placed top plates A² and A³ having openings registering with the runners x'. The mold and billet core are then heated in one of the ways described for preventing oxidation, as for instance, the interior of the mold between the core and the sides may be filled with carbonic acid gas or other neutral gas and the core and mold are heated as described to a substantially high temperature which will not chill the coating metal too rapidly when it is poured in. The coating metal in a molten state of a different kind from the core is then poured through the runners x' to fill the space around the core. The mold and core are immediately carried beneath the piston of a suitable hydraulic press or other kind of press, and pressure is applied to the top of the sleeve E which forces the semi-liquid coating metal longitudinally and compresses it strongly against the surface of the core metal, causing them to weld together and suppressing all blow-holes and other defects in the coating metal. A portion of the ram F of a suitable press is shown bearing upon the sleeve E in Fig. 6. The length of the block D is such that when the sleeve E is forced down by the action of the press, preferably all the coating metal is forced off of said block and compressed on the core A'. When the bi-metallic ingot or billet so produced is sufficiently cooled it is removed from the mold and is then ready to be treated by re-heating and rolling to obtain any desired bi-metallic products.

In some cases, I have found it useful to coat the core after cleaning with an electrolytic deposit of copper or other suitable metal before performing further operations. Another expedient which I have found useful in this and similar processes, is to paint the cleaned core or base with a non-oxidizing or indifferent coating which will melt at the temperature of the coating operation, flowing off from the surface of contact as the two metals meet, preventing access of air and permitting the two clean metals to contact absolutely. Such a paint as a mixture of silicate of the alkalies (waterglass) and aluminum powder will give good results. This particular mixture possesses the additional advantage that in contact with a molten coating metal, such as copper, any oxid which may be present in or on it, is reduced. The alumina formed slags off with the silicate. A core so painted may be very conveniently heated in many ways without fear of oxidation or other deleterious contamination.

Obviously the apparatus for carrying out this process may vary widely and different modes of operation may be found for producing the same ends, by substantially the same steps, therefore, without enumerating all the equivalents of this process, I claim and desire to obtain by Letters Patent the following:—

1. The process of producing compound metal bodies comprising unlike metals welded together which consists in placing a body of ferrous metal in a mold, casting thereagainst a body of molten non-ferrous metal of high melting point, and compressing the molten metal and solid metal together while said molten metal is in a fluent condition and adapted to transmit pressure to all abutting surfaces of the two metals.

2. The process of producing compound metal bodies comprising steel and an unlike metal welded together which consists in placing a body of steel in a mold, casting thereagainst a body of molten non-ferrous metal of high melting point, and compressing the molten metal and solid metal together while said molten metal is in a fluent condition and adapted to transmit pressure to all abutting surfaces of the two metals.

3. The process of producing compound metal bodies comprising steel and copper welded together which consists in placing a body of steel in a mold, casting thereagainst a body of molten copper and compressing steel and copper together while the copper is in a fluent condition and adapted to transmit pressure to all abutting surfaces of the two metals.

4. The process of producing coextended compound metal-ware composed of unlike metals welded together which consists in placing a body of a ferrous metal in a mold, casting thereagainst a body of molten non-ferrous metal of high melting point, compressing both metals together while the molten metal is in a fluent condition and adapted to transmit pressure to all abutting surfaces of the two metals, and thereafter coextending the compound ingot so formed while still in a heated condition.

5. The process of producing compound metal bodies of unlike metals welded together, which comprises placing a body of ferrous metal within a suitable mold, heating said metal to a suitable temperature in such manner as to prevent oxidation, running into the mold between the said metal body and the side of the mold a molten non-ferrous metal of high melting point, and forcing the two metals together by pressure applied to the molten metal while the same is still in a fluent condition and adapted to transmit said pressure to the entire abutting surfaces of the metals to perfectly weld them and thereby suppress any flaws between them.

6. The process of producing compound metal bodies comprising a ferrous and a non-ferrous metal welded together, which comprises casting one such metal against a body of the other metal, applying pressure to the molten metal while the same is in a fluent condition and adapted to transmit pressure to the entire abutting surfaces of the metals, and thereby welding them together and suppressing any flaws between them.

7. The process of producing compound metal bodies comprising a ferrous and a non-ferrous metal welded together, which comprises casting one such metal against an oxid free surface of a body of the other metal heated to a suitable temperature, applying pressure to the molten metal while the same is in a fluent condition and adapted to transmit pressure to the entire abutting surfaces of the metals, and thereby welding them together and suppressing any flaws between them.

8. The process of producing compound metal bodies comprising a ferrous and a non-ferrous metal welded together, which comprises casting one such metal around and against a core of the other metal, applying pressure to the molten metal while the same is in a fluent condition and adapted to transmit pressure to the entire abutting surfaces of the metals, and thereby welding them together and suppressing any flaws between them.

9. The process of producing compound metal bodies comprising a ferrous and a non-ferrous metal welded together, which comprises casting the non-ferrous metal around and against a core of ferrous metal heated to a suitable temperature and having an oxid-free surface for contact with the cast metal, applying pressure to the molten metal while the same is in a fluent condition and adapted to transmit pressure to the entire abutting surfaces of the metals, and thereby welding them together and suppressing any flaws between them.

In testimony whereof I have signed this specification in the presence of two subscribing witnesses.

JOHN FERREOL MONNOT.

Witnesses:
OLIN A. FOSTER,
A. L. O'BRIEN.